United States Patent
Ochiai et al.

(10) Patent No.: US 10,543,804 B2
(45) Date of Patent: Jan. 28, 2020

(54) AIRBAG SEWING STRUCTURE

(71) Applicant: HONDA MOTOR CO., LTD., Tokyo (JP)

(72) Inventors: Fumiharu Ochiai, Wako (JP); Hiroshi Hanjono, Wako (JP); Kanichi Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 15/811,091

(22) Filed: Nov. 13, 2017

(65) Prior Publication Data

US 2018/0134246 A1  May 17, 2018

(30) Foreign Application Priority Data

Nov. 14, 2016 (JP) .................................. 2016-221533

(51) Int. Cl.
*B60R 21/235* (2006.01)

(52) U.S. Cl.
CPC .. *B60R 21/235* (2013.01); *B60R 2021/23576* (2013.01)

(58) Field of Classification Search
CPC ........ B60R 2021/23576; B60R 21/235; B60R 21/00
See application file for complete search history.

(56) References Cited

U.S. PATENT DOCUMENTS

| | | | |
|---|---|---|---|
| 5,100,168 A | 3/1992 | Horiuchi et al. | |
| 5,114,180 A | * 5/1992 | Kami .................... | B60R 21/235 280/739 |
| 5,826,905 A | * 10/1998 | Tochacek .............. | B60R 21/235 280/743.1 |

(Continued)

FOREIGN PATENT DOCUMENTS

| CN | 1021867 C | 8/1993 |
|---|---|---|
| CN | 100423970 C | 10/2008 |

(Continued)

OTHER PUBLICATIONS

Office Action dated Jun. 20, 2018, issued in counterpart Japanese Application No. 2016-221533, with English machine translation. (7 pages).

(Continued)

*Primary Examiner* — Paul N Dickson
*Assistant Examiner* — Timothy Wilhelm
(74) *Attorney, Agent, or Firm* — Westerman, Hattori, Daniels & Adrian, LLP

(57) ABSTRACT

A first panel 12 includes: a fold-back part 12c formed by folding back the first panel along an edge part 12a of the first panel; and a seam allowance part 12d laid on top of the fold-back part 12c, the second panel 13 is sewed to the first panel with a first chain stitch 17 while being laid on top of the fold-back part 12c, and a chain part 17a of the first chain stitch 17 is located between the fold-back part 12c and the seam allowance part 12d. Thus, because the chain part 17a

(Continued)

of the first chain stitch 17 is covered by the seam allowance part 12d of the first panel 12, the chain part 17a of the first chain stitch 17 is prevented from rubbing against other members during deployment of the airbag 11, whereby the reliability of a sewing section 14 can be enhanced.

3 Claims, 5 Drawing Sheets

(56) References Cited

U.S. PATENT DOCUMENTS

| 7,287,478 | B2* | 10/2007 | Keshavaraj | B60R 21/235 |
| | | | | 112/402 |
| 9,027,961 | B2* | 5/2015 | Yamataki | B60R 21/18 |
| | | | | 280/728.1 |
| 10,005,419 | B2* | 6/2018 | Konaka | B60R 21/213 |
| 2019/0061674 | A1* | 2/2019 | Ishiguro | B60R 21/2338 |
| 2019/0084519 | A1* | 3/2019 | Lowe | B60R 21/235 |

FOREIGN PATENT DOCUMENTS

| JP | 3-128743 A | 5/1991 |
| JP | 3-96954 U | 10/1991 |
| JP | 10-166978 A | 6/1998 |
| JP | 2005-514267 A | 5/2005 |

OTHER PUBLICATIONS

Office Action dated Aug. 23, 2019, issued in counterpart CN Application No. 201711058922.8, with English translation (11 pages).

Search Report dated Aug. 15, 2019, issued in counterpart CN Application No. 201711058922.8 (2 pages).

* cited by examiner

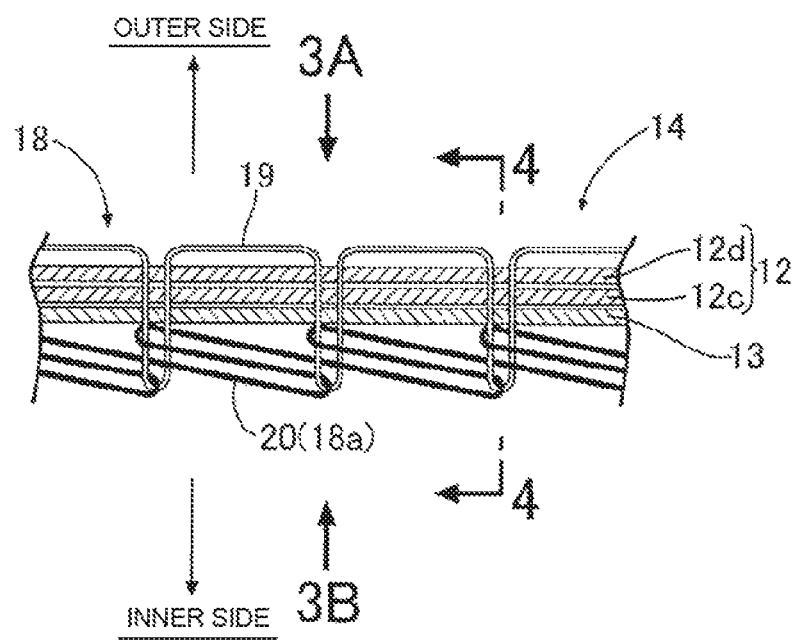

AIRBAG SEWING STRUCTURE

CROSS-REFERENCE OF RELATED APPLICATION

This application claims priority of Japanese Patent Application No. 2016-221533 filed in Japan on Nov. 14, 2016, the entire contents of which are incorporated herein by reference.

TECHNICAL FIELD

The present invention relates to an airbag sewing structure by which a first panel and a second panel are sewed together at a sewing section to form an airbag.

BACKGROUND OF THE INVENTION

Japanese Unexamined Utility Model Application Publication No. Hei 3-96954 describes in FIG. 5 an airbag in which, for sewing together a first fabric 1 and a second fabric 2 constituting the airbag, the first fabric 1 and the second fabric 2 are first sewed together with a first seam 4 while they are laid one on top of another with their edges 1a, 2a aligned, and then the second fabric 2 is folded back by 180° around the first seam 4 and the single-layer first fabric 1 and the double-layer second fabric 2 are sewed together with double-line second seams 5.

Besides, Japanese Patent Application Publication No. Hei 10-166978 describes in FIG. 2 an airbag in which a part where a passenger-side fabric 12, an inflator-side fabric 14, and an anti-gas leakage tape 30 of the airbag are laid in three layers is sewed at a circumference sewing section 16 formed by a chain stitch.

SUMMARY OF INVENTION

Meanwhile, a chain stitch typically used for sewing panels (fabrics) of an airbag together is constituted of: an upper thread that penetrates both faces of stacked panels; and a lower thread that entwines, in a chain fashion, with a part of the upper thread exposed on one face of one of the panels. Hence, the lower thread necessarily sticks out large from the face of the panel.

Accordingly, in the case of employing the chain stitch of the airbag of Japanese Patent Application Publication No. Hei 10-166978 in the sewing section of the airbag of Japanese Unexamined Utility Model Application Publication No. Hei 3-96954, what is expected is to enhance the reliability of the sewing section against risks such as rubbing of chain parts of the chain stitch that stick out large from one face of one of the panels against each other and rubbing of the chain parts against other parts of the airbag during deployment of the folded airbag into the vehicle compartment.

The present invention has been made in view of the above circumstances, and aims to enhance the reliability of a sewing section at which panels of an airbag are sewed together.

In order to achieve the above objective, an invention according to claim 1 provides an airbag sewing structure by which a first panel and a second panel are sewed together at a sewing section to form an airbag, the structure being characterized in that the first panel includes: a fold-back part formed by folding back the first panel along an edge part of the first panel; and a seam allowance part laid on top of the fold-back part, the second panel is sewed to the first panel with a first chain stitch while being laid on top of the fold-back part, and a chain part of the first chain stitch is located between the fold-back part and the seam allowance part.

Further, an invention according to claim 2 provides the airbag sewing structure characterized in that, in addition to the configuration according to claim 1, the seam allowance part is secured to the fold-back part at a position closer to the edge part than the first chain stitch.

Further, an invention according to claim 3 provides the airbag sewing structure characterized in that, in addition to the configuration according to claim 2, the seam allowance part is sewed to the fold-back part and the second panel with a second chain stitch, and the chain part of the first chain stitch and a chain part of the second chain stitch are located opposite each other with the fold-back part and the second panel in between.

Further, an invention according to claim 4 provides the airbag sewing structure characterized in that, in addition to the configuration according to any one of claims 1 to 3, the first panel and the second panel are sewed together with the multiple first chain stitches.

Effect of Embodiments of the Invention

According to the configuration of claim 1, the first panel includes: the fold-back part formed by folding back the first panel along the edge part of the first panel; and the seam allowance part laid on top of the fold-back part, the second panel is sewed to the first panel with the first chain stitch while being laid on top of the fold-back part, and the chain part of the first chain stitch is located between the fold-back part and the seam allowance part. Thus, because the chain part of the first chain stitch is covered by the seam allowance part of the first panel, the chain part of the first chain stitch is prevented from rubbing against other members during deployment of the airbag, whereby the reliability of the sewing section can be enhanced.

Besides, according to the configuration of claim 2, the seam allowance part is secured to the fold-back part at the position closer to the edge part than the first chain stitch. Thus, by preventing the seam allowance part from being separated from the second panel in order not to expose the chain part of the first chain stitch, the rubbing of the first chain stitch can be prevented more reliably.

Besides, according to the configuration of claim 3, the seam allowance part is sewed to the fold-back part and the second panel with the second chain stitch, and the chain part of the first chain stitch and the chain part of the second chain stitch are located opposite each other with the fold-back part and the second panel in between. Thus, it is possible to prevent the seam allowance part of the first chain stitch and the seam allowance part of the second chain stitch from rubbing against each other by the fold-back part and the second panel.

Besides, according to the configuration of claim 4, the first panel and the second panel are sewed together with the multiple first chain stitches. Thus, it is possible to prevent the multiple first chain stitches from rubbing against each other by the seam allowance part that covers these chain parts.

BRIEF DESCRIPTION OF THE DRAWINGS

FIG. 2 is a sectional view taken along the line 2-2 in FIG. 1(A) or FIGS. 3(A) and 3(B) (first embodiment).

DETAILED DESCRIPTION OF EMBODIMENTS OF THE INVENTION

First Embodiment

Hereinbelow, a first embodiment of the present invention is described based on FIGS. 1 to 4.

Figure 1A:
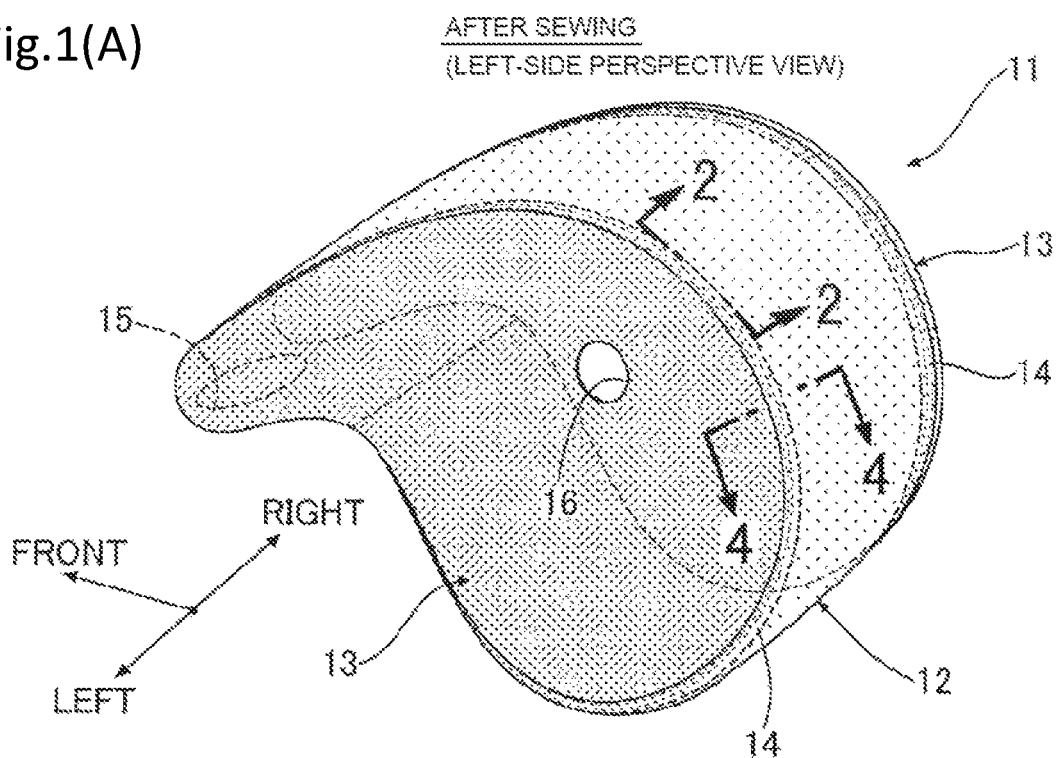
FIGS. 1(A) and 1(B) are a perspective view and an exploded view of an airbag (first embodiment).
Figure 1B:
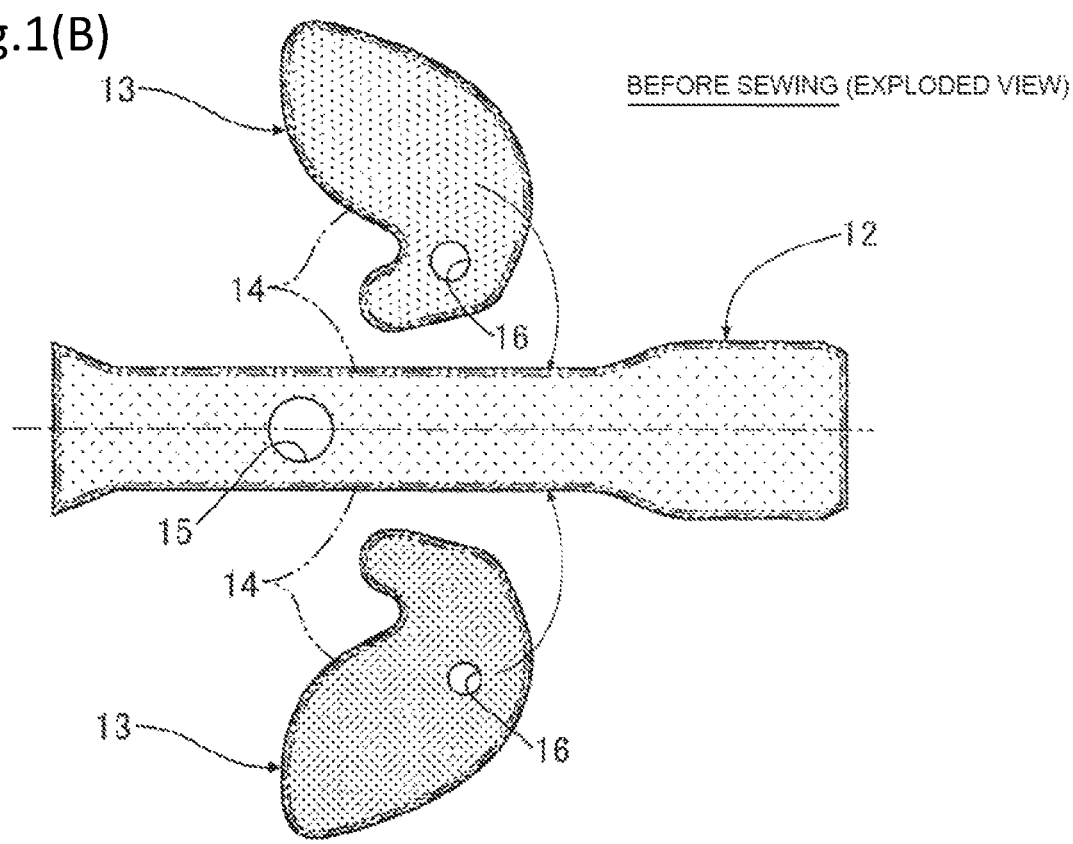

As illustrated in FIGS. 1(A) and 1(B), an airbag 11 for a passenger's seat of a vehicle is formed in such a way that a central first panel 12 and a pair of left and right second panels 13, 13 made by cutting a fabric in predetermined shapes are sewed together in one piece at two sewing sections 14, 14. A gas feed port 15 through which high-pressure gas is fed from an inflator (not illustrated) is formed in the first panel 12, whereas vent holes 16, 16 through which excess gas is discharged are formed in the second panels 13, 13. This embodiment has characteristics in the sewing sections 14, 14 for sewing the first panel 12 and the second panels 13 together.

Hereinbelow, the structure of the sewing sections 14 is described based on FIGS. 2 to 4. Note that, throughout this specification, an outer side denotes the outer side of the completed airbag 11, and an inner side denotes the inner side of the completed airbag 11.

Figure 4:
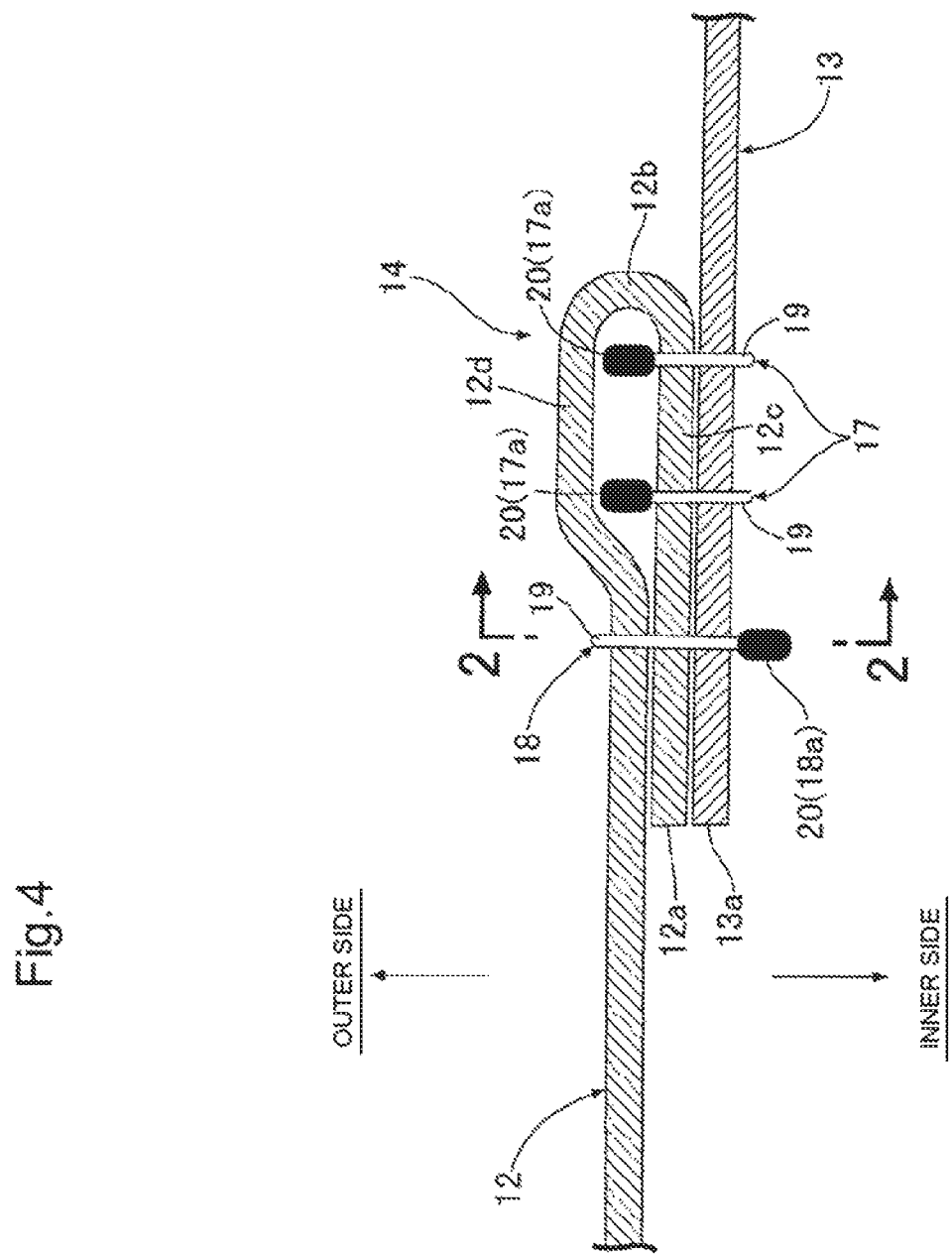
FIG. 4 is a sectional view taken along the line 4-4 in FIG. 1(A) or FIG. 2 (first embodiment).

As illustrated in FIG. 4, the first panel 12 is folded to the inner side at a fold line 12b extending along an edge part 12a of the first panel. A strip-shaped fold-back part 12c is formed between the edge part 12a and the fold line 12b, and a strip-shaped seam allowance part 12d is formed opposite the fold-back part 12c with the fold line 12b in between. Thus, after the panels are sewed together, the fold-back part 12c and the seam allowance part 12d are laid one on top of another. Each second panel 13 is sewed to the first panel 12 with double-line first chain stitches 17, 17 and a single-line second chain stitch 18 while being laid on the inner side of the fold-back part 12c of the first panel 12 in such a way that its edge part 13a is aligned with the edge part 12a of the first panel 12.

Figure 3A:
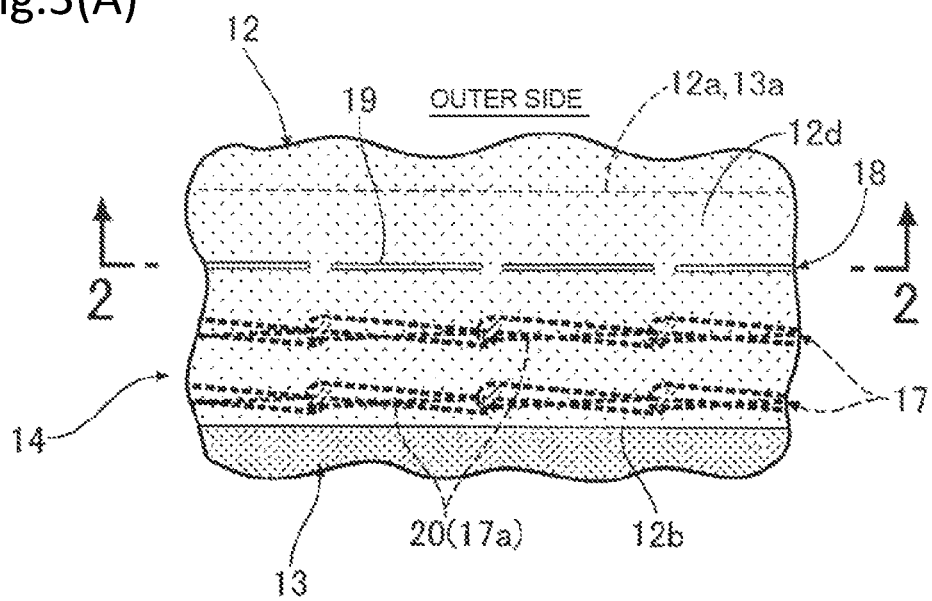
FIGS. 3(A) and 3(B) are views seen in the directions of arrows 3A and 3B in FIG. 2 (first embodiment).
Figure 3B:
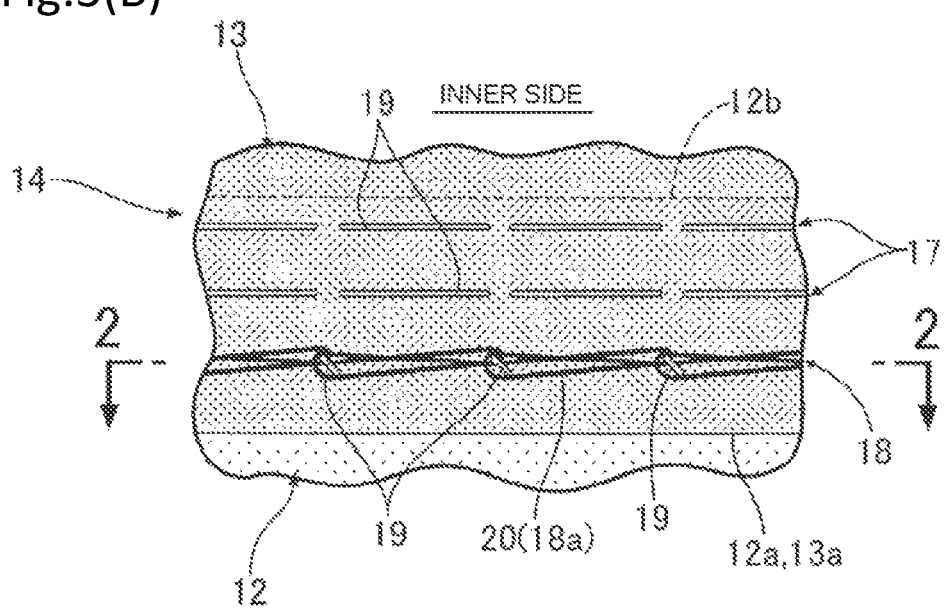

As illustrated in FIGS. 2 and 3, the second chain stitch 18, with which to sew together a part where the seam allowance part 12d of the first panel 12, the fold-back part 12c of the first panel 12, and the second panel 13 are laid one on top of the other in three layers, is constituted of: an upper thread 19 that penetrates the first panel 12 and the second panel 13; and a lower thread 20 that entwines, in a chain fashion, with a part of the upper thread 19 sticking out on the inner side of the second panel 13. The upper thread 19 is exposed on the outer side of the first panel 12 and the inner side of the second panel 13, whereas the lower thread 20 is exposed only on the inner side of the second panel 13 and this exposed portion constitutes a chain part 18a of the second chain stitch 18.

The first chain stitches 17 differ from the above second chain stitch 18 in that their upper threads 19 penetrate only a part where the fold-back part 12c of the first panel 12 and the second panel 13 are laid one on top of another in two layers and do not penetrate the seam allowance part 12d of the first panel 12. Besides, the chain part 18a of the second chain stitch 18 is located on the inner side of the second panel 13, whereas chain parts 17a of the first chain stitches 17 are located on the outer side of the fold-back part 12c of the first panel 12.

The sewing of the sewing sections 14 is performed in the following procedure. First, while the first panel 12 and the second panel 13 are laid one on top of another with their edge parts 12a, 13a aligned, the fold-back part 12c of the first panel 12 and the second panel 13 are sewed together from the inner side of the second panel 13 with the double-line first chain stitches 17, 17. As a result, the chain parts 17a, 17a of the first chain stitches 17, 17 are formed on the outer side of the fold-back part 12c of the first panel 12.

Next, the first panel 12 is folded back by 180° around the fold line 12b, and then the seam allowance part 12d of the first panel 12, the fold-back part 12c of the first panel 12, and the second panel 13 are sewed together from the outer side of the seam allowance part 12d of the first panel 12 with the second chain stitch 18. As a result, the chain part 18a of the second chain stitch 18 is exposed on the inner side of the second panel 13, and the chain parts 17a, 17a of the first chain stitches 17, 17 are covered from the outer side by the seam allowance part 12d of the first panel 12.

In the meantime, when the folded airbag 11 inflates with high-pressure gas fed from the inflator and deploys inside a vehicle compartment, since the chain parts 17a, 17a of the first chain stitches 17, 17 being the main sewing section of the first panel 12 and the second panel 13 of the airbag 11 stick out relatively high from the fold-back part 12c of the first panel 12, the chain parts 17a, 17a might rub against each other or rub against other parts of the airbag 11 or a part of an instrument panel.

However, according to this embodiment, because the chain parts 17a, 17a of the first chain stitches 17, 17 being the main sewing section are covered and protected by the seam allowance part 12d of the first panel 12, they are prevented from rubbing against other parts during deployment of the airbag 11, whereby the reliability of the sewing sections 14 is enhanced. In addition, because the seam allowance part 12d of the first panel 12 is sewed to the fold-back part 12c of the first panel 12 and the second panel 13 with the auxiliary second chain stitch 18, the seam allowance part 12d is prevented from curling up from the fold-back part 12c of the first panel 12 by the second chain stitch 18, whereby the reliability of the sewing sections 14 is further enhanced.

Moreover, because the chain parts 17a, 17a of the first chain stitches 17, 17 and the chain part 18a of the second chain stitch 18 are located opposite each other with the fold-back part 12c of the first panel 12 and the second panel 13 in between, it is possible to prevent the chain parts 17a, 17a of the first chain stitches 17, 17 and the chain part 18a of the second chain stitch 18 from rubbing against each other more reliably. Further, although the chain parts 17a, 17a of the double-line first chain stitches 17, 17 are likely to rub against each other because they are arranged adjacently, it is possible to prevent them from rubbing against each other by covering them with the seam allowance part 12d of the first panel 12.

Second to Sixth Embodiments

Next, second to sixth embodiments of the present invention are described based on FIGS. 5(A) to 5(E).

Figure 5A:
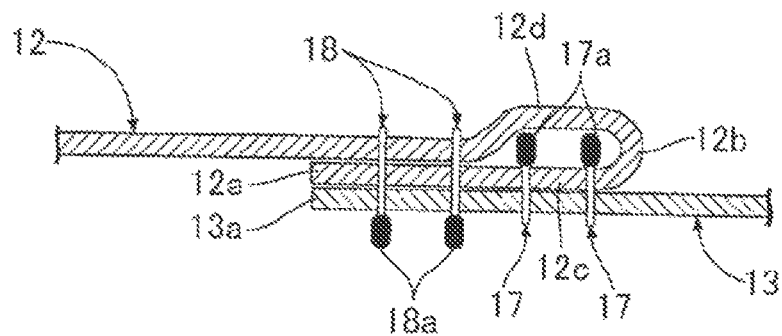
FIGS. 5(A) to 5(E) are views corresponding to FIG. 4 (second to fifth embodiments).

The first embodiment includes the single-line second chain stitch 18, whereas the second embodiment illustrated in FIG. 5(A) includes double-line second chain stitches 18, 18.

Figure 5B:
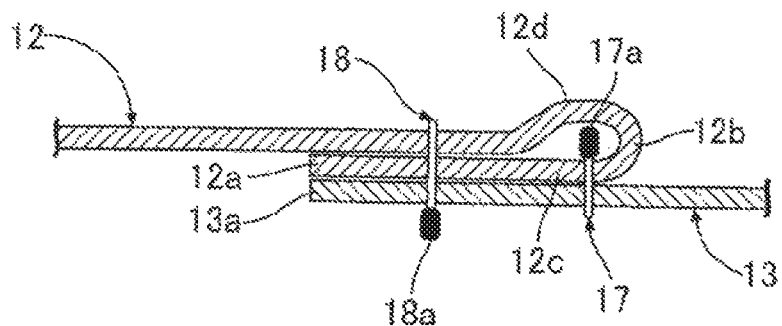

Meanwhile, the first embodiment includes the double-line first chain stitches 17, 17, whereas the third embodiment illustrated in FIG. 5(B) includes a single-line first chain stitch 17.

Figure 5C:
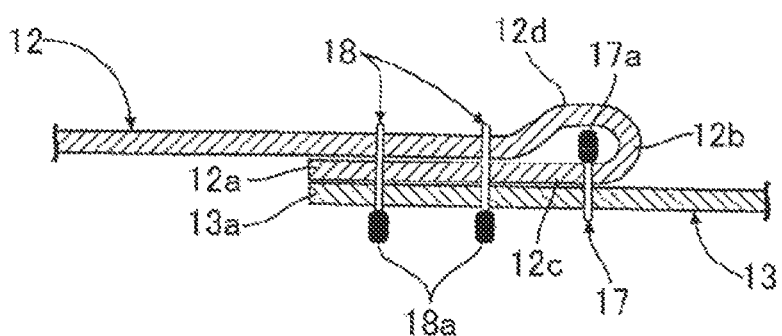

Meanwhile, the first embodiment includes the double-line first chain stitches 17, 17 and the single-line second chain stitch 18, whereas the fourth embodiment illustrated in FIG. 5(C) includes a single-line first chain stitch 17 and double-line second chain stitches 18, 18.

Figure 5D:
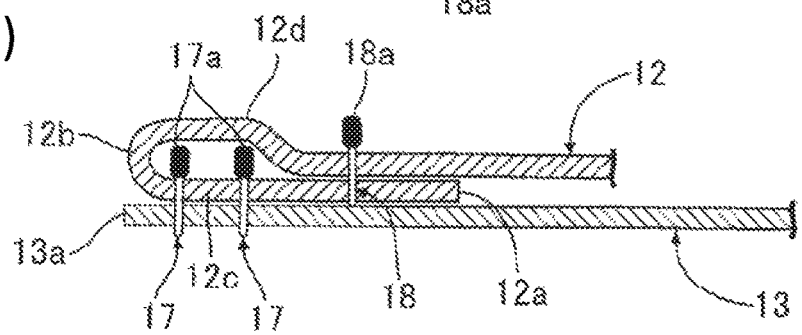

Meanwhile, in the first embodiment, the second panel 13 extends in the opposite direction from the first panel 12; on the other hand, in the fifth embodiment illustrated in FIG. 5(D), the second panel 13 extends in the same direction as the first panel 12, and the chain part 18*a* of the second chain stitch 18 sewing the seam allowance part 12*d* and the fold-back part 12*c* of the first panel 12 together is located on the seam allowance part 12*d* side.

Figure 5E:
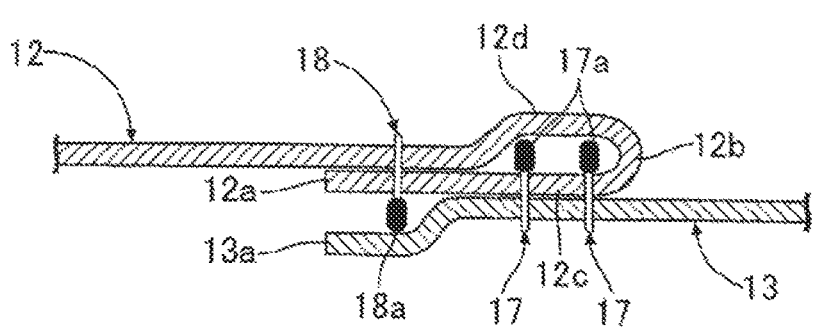

Meanwhile, in the first embodiment, the second chain stitch 18 sews the seam allowance part 12*d* of the first panel 12, the fold-back part 12*c* of the first panel 12, and the second panel 13; on the other hand, in the sixth embodiment illustrated in FIG. 5(E), the second chain stitch 18 does not sew the second panel 13 and sews only the seam allowance part 12*d* of the first panel and the fold-back part 12*c* of the first panel 12.

These second to sixth embodiments can also achieve the same operation and effect as the first embodiment. In particular, according to the sixth embodiment illustrated in FIG. 5(E), because the chain part 18*a* of the second chain stitch 18 is covered by the second panel 13, it is possible to protect the chain part 18*a* more effectively.

The embodiments of the present invention have been described above; however, various design changes can be made on the present invention without departing from the gist thereof.

For example, although the airbag 11 for a passenger's seat is exemplified in the embodiments, the present invention is also applicable to any airbag other than the airbag 11 for a passenger's seat.

In addition, any number of panels constituting the airbag 11 may be employed as long as it is two or more, and the present invention can be applied to sewing sections of at least two panels of them.

Further, the second chain stitch 18 being the auxiliary sewing section can be replaced with another way such as any stitch other than a chain stitch or a bond.

The invention claimed is:

1. An airbag sewing structure comprising:
   a first panel and a second panel which are sewed together at a sewing section to form an airbag, wherein
   said first panel comprises a fold-back part and a seam allowance part, in which the fold-back part is folded back along an edge of said first panel so as to overlap the seam allowance part,
   said second panel is sewed to said first panel with a first chain stitch at the sewing section in which said fold-back part and a part of said second panel overlap each other,
   a chain part of said first chain stitch is located between said fold-back part and said seam allowance part,
   said seam allowance part is sewed to both of said fold-back part and said second panel with a second chain stitch, and
   said chain part of said first chain stitch and a chain part of said second chain stitch are located opposite each other with respect to said fold-back part and said second panel.

2. The airbag sewing structure according to claim 1, wherein said seam allowance part is secured to said fold-back part at a position closer to said edge of said first panel than said first chain stitch.

3. The airbag sewing structure according to claim 1, wherein said first panel and said second panel are sewed together with a plurality of said first chain stitches.

* * * * *